United States Patent
Bank et al.

(10) Patent No.: US 8,190,693 B2
(45) Date of Patent: May 29, 2012

(54) RECLAIMING LOST INTERNET CUSTOMERS

(75) Inventors: Judith H. Bank, Morrisville, NC (US); Dimple Bhatia, San Jose, CA (US); Lisa M. Bradley, Cary, NC (US); Dana L. Price, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 12/637,800

(22) Filed: Dec. 15, 2009

(65) Prior Publication Data

US 2011/0145339 A1 Jun. 16, 2011

(51) Int. Cl.
*G06F 15/16* (2006.01)
(52) U.S. Cl. ........................................................ 709/206
(58) Field of Classification Search ................... 709/206
See application file for complete search history.

(56) References Cited

U.S. PATENT DOCUMENTS

| | | | | |
|---|---|---|---|---|
| 7,225,232 | B2 * | 5/2007 | Elberse ........................ | 709/206 |
| 7,860,803 | B1 * | 12/2010 | Chang et al. .................... | 705/65 |
| 2001/0033294 | A1 | 10/2001 | Asch et al. | |
| 2003/0028817 | A1 * | 2/2003 | Suzuyama et al. ................ | 714/4 |
| 2003/0083917 | A1 * | 5/2003 | Tracey et al. .................... | 705/7 |
| 2006/0272018 | A1 | 11/2006 | Fouant | |
| 2006/0288100 | A1 | 12/2006 | Carson et al. | |
| 2007/0124399 | A1 * | 5/2007 | Gillespie et al. .............. | 709/206 |
| 2008/0104165 | A1 | 5/2008 | Lo et al. | |
| 2008/0313323 | A1 * | 12/2008 | Morris ........................... | 709/224 |

OTHER PUBLICATIONS

Router IP Traffic Export Packet Capture Enhancements, http://www.cisco.com/en/US/docs/ios/12_4t/12_4t11/ht_rawip.html#wp1051438, accessed Dec. 15, 2009.
How to send instant messages over secure networks, http://www.tweakxp.com/article36929.aspx, accessed Dec. 15, 2009.
Instant Messaging with Command Prompt with IP address, http://discussions.virtualdr.com/archive/index.php/t-134059.html, accessed Dec. 15, 2009.

* cited by examiner

*Primary Examiner* — Brian P Whipple
(74) *Attorney, Agent, or Firm* — Jordan IP Law, PC

(57) ABSTRACT

A system and method of reclaiming lost Internet customers may involve detecting an outage condition associated with a host of an electronic commerce (e-commerce) web site. Customer data can be extracted from packets destined for the host, wherein the packets could be associated with transactions between customers and the web site. The extracted customer data may be stored and, upon detecting a resolution of the outage condition, a customer database can be searched based on the extracted customer data in order to identify customer contact information. A customer reclamation message may then be sent to the customer, wherein the message can incentivize the customer to return to the web site and request completion of the transaction.

17 Claims, 2 Drawing Sheets

RECLAIMING LOST INTERNET CUSTOMERS

BACKGROUND

1. Technical Field

Embodiments of the present invention generally relate to Internet-based data processing systems. More particularly, embodiments of the invention relate to the reclaiming of lost Internet customers.

2. Discussion

The evolution of the Internet has enabled consumers to conduct transactions on a wide variety of web sites. Outages, however, can present a significant challenge to these electronic commerce (e-commerce) activities. For example, denial of service attacks have been known to cause the unavailability of highly popular web sites. Such outages can be significantly disruptive to a business, particularly when customers are unable to complete transactions such as purchasing items already placed in a virtual shopping cart. In some cases, customers may not return to the site once service has been restored because they might be unaware of the resolution of the outage. Indeed, absent such knowledge and/or sufficient incentive to return, the customer may simply chose another competing site, resulting in the loss of the sale and/or customer altogether.

BRIEF SUMMARY

Embodiments may provide for a computer program product comprising a computer readable medium and computer usable code stored on the computer readable medium. If executed by a processor, the computer usable code can cause a computer to detect an outage condition associated with a host of an electronic commerce (e-commerce) web site. The code may also cause a computer to extract customer data from a packet destined for the host, wherein the packet is to be associated with a transaction between a customer and the e-commerce web site. In addition, the extracted customer data may include at least one of a cookie, an Internet Protocol (IP) address, a Hypertext Transfer Protocol (HTTP) header, an email address, and HTTP POST data. The code may also cause a computer to store the extracted customer data to a file. In response to detecting a resolution of the outage condition, the code can cause a computer to transmit the file to the host or other computing platform.

Embodiments can also provide for a computer program product comprising a computer readable medium and computer usable code stored on the computer readable medium. If executed by a processor, the computer usable code may cause a computer to receive a file containing customer data extracted from one or more packets destined for a host of an e-commerce web site during an outage condition associated with the host. The packets could be associated with a transaction between a customer and the e-commerce web site. In one example, the extracted data is to include at least one of a cookie, an IP address, a HTTP header, an email address, and HTTP POST data. The code may also cause a computer to search a customer database for the extracted customer data, and identify contact information for the customer if the extracted customer data is found in the customer database. The code can also cause a computer to select a notification mode based on the contact information, and transmit a customer reclamation message to the customer based on the contact information and the notification mode. The customer reclamation message may request completion of the transaction between the customer and the e-commerce web site. The searching, identifying, selecting and transmitting may be repeated for a plurality records in the file.

Embodiments may also provide for a computer-implemented method in which an outage condition associated with a host of a web site is detected. The outage condition could be associated with at least one of a denial of service attack, a network failure, and an application failure. The method may also provide for extracting customer data from a packet destined for the host, wherein the packet is associated with a transaction between a customer and the web site. The extracted data can include HTTP POST data associated with a shopping cart. The method can also involve storing the extracted customer data. A customer database may be searched for the extracted customer data. If the extracted customer data is found in the customer database, contact information can be identified for the customer. In addition, the method may provide for selecting a notification mode based on the contact information, and transmitting a customer reclamation message to the customer based on the contact information and the notification mode. The customer reclamation message can request completion of the transaction between the customer and the web site. The method may also detect a return of the customer to the web site, and displaying the HTTP POST data in a form in response to detecting the return of the customer.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
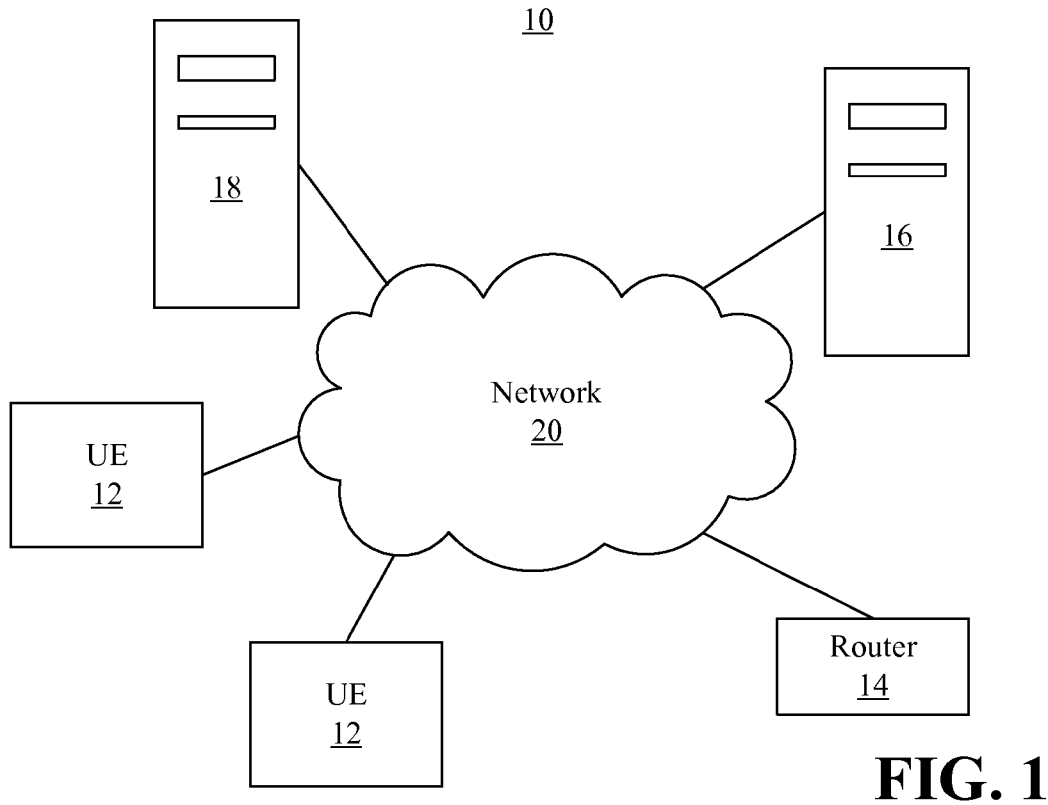
FIG. 1 is a block diagram of an example of a computing system architecture according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, an architecture 10 is shown in which lost customers operating user equipment (UE) 12 may be reclaimed via one or more processes deployed on router(s) 14, web site host(s) 16 and/or other computing platforms 18. In the illustrated example, the UE 12, which can include web browsing capability, may be a personal computer (PC), notebook computer, personal digital assistant (PDA), wireless smartphone, or other device having access to the host 16, via a network 20. The UE 12 connections to the network 20 may include a wireless data connection (e.g., IEEE 802.11, 1999 Edition, LAN/MAN Wireless LANS (WiFi), IEEE 802.16-2004, LAN/MAN Broadband Wireless LANS (WiMAX), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances. The UE 12 devices could be located in the same physical location or in different locations.

In addition, the network 20 can include any suitable combination of servers, access points, routers such as router 14, base stations, mobile switching centers, public switching telephone network (PSTN) components, etc., to facilitate communication between the UE 12 and the web site host 16. The web site host 16, which might support a wide variety of e-commerce transactions and activities, may include distributed and/or redundant web-based servers that are able to respond to web page requests for content. Thus, the web site host 16 can have stored thereon hypertext markup language (HTML) and other markup language-encoded content, as well as databases and applications such as Java and other applications. The web site host 16 could also be part of a cloud computing environment in which resources are shared across platforms in a complex fashion.

In one example, the router 14 constitutes a computer program product having a computer readable medium with computer usable code stored on the computer readable medium, wherein, if executed by a processor, the computer usable code can cause the router 14 to generate outage reports that can be used to reclaim lost Internet customers. The host 16 and/or other computing platform 18, may constitute computer program products having a computer readable medium with computer usable code stored on the computer readable medium, wherein, if executed by a processor, the computer usable code may cause the host 16 and/or other computing platform 18 to process outage logs/files and reclaim lost Internet customers.

Figure 2:
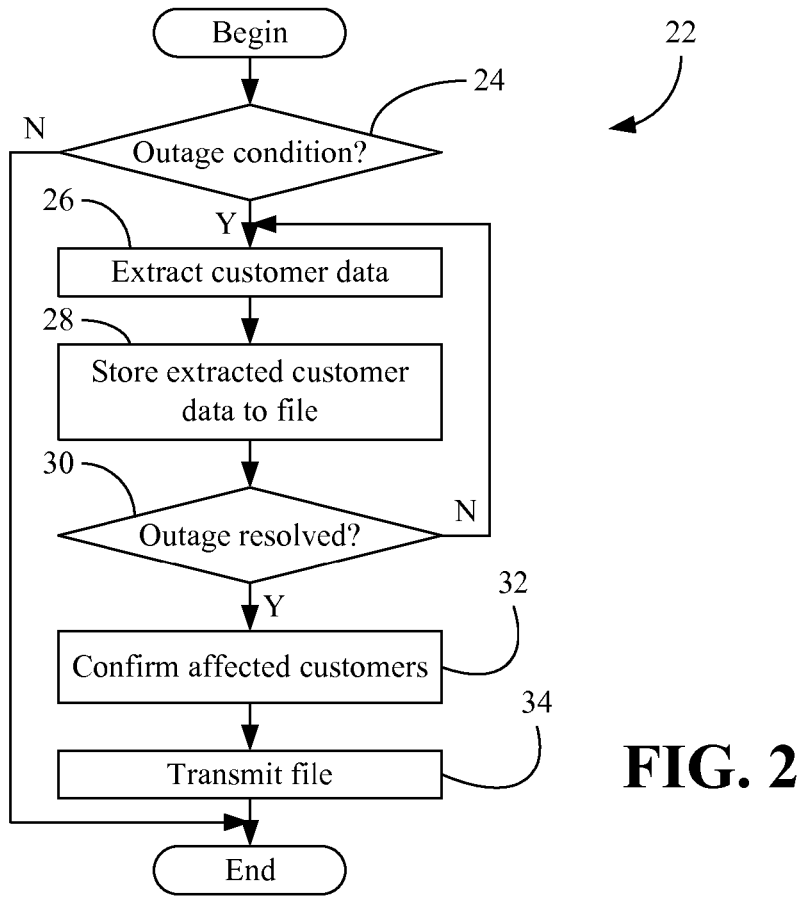
FIG. 2 is a flowchart of an example of a method of compiling an outage log according to an embodiment.

In particular, FIG. 2 shows a method 22 that can be deployed in a router 14 (FIG. 1) or other suitable network device in order to support the reclamation of lost Internet customers. Processing block 24 provides for detecting an outage condition associated with a host of an e-commerce web site. In particular, network routers can detect lost network data packets and rejected data packets. Using such a detection configuration, a network router can determine with reasonable certainty, that a network (IP) address is not available to accept new traffic. This condition can occur, for example, from a denial of service attack, a server failure, a network failure, or a software application failure. The network router control program can therefore be configured or modified to conclude that a web site and/or host (e.g., web server) is "down" after a predetermined and configurable percent of packets are lost or rejected. Thus, block 24 might involve detecting a level of lost packets destined for the host that exceeds a predefined packet loss threshold, or detecting a level of rejected packets destined for the host that exceeds a packet rejection threshold.

In addition, network routers can also be configured to collect IP addresses of network packets in memory as a file and/or log. For example, the Series 1841, 2800 and 3800 routers from Cisco Systems, Inc., of San Jose, Calif., support IP traffic capture. Other customer data such as HTTP headers, email addresses, and HTTP POST data (e.g., shopping cart data) may also be collected from routed packets. Thus, block 26 provides for extracting customer data from one or more packets destined for a host of a web site, wherein the packets may be associated with a transaction between a customer and the web site. In addition block 28 provides for storing the extracted customer data to an outage file/log. The extraction and storage processes may be repeated for a plurality of transactions between a plurality of customers and the web site until a resolution of the outage condition is detected at block 30. The resolution might be detected that the levels of lost or rejected packets have fallen below their respective thresholds.

Illustrated block 32 provides for confirming that the customers corresponding to the outage file have been affected by the outage condition. In particular, the router might analyze the outage file to identify source IP addresses that did not experience a certain amount of packet loss or rejection, and extract customer data corresponding to those source IP addresses from the file before transmitting the file at block 34. The file may be transmitted to the host of the web site or some other computing platform.

Figure 3:
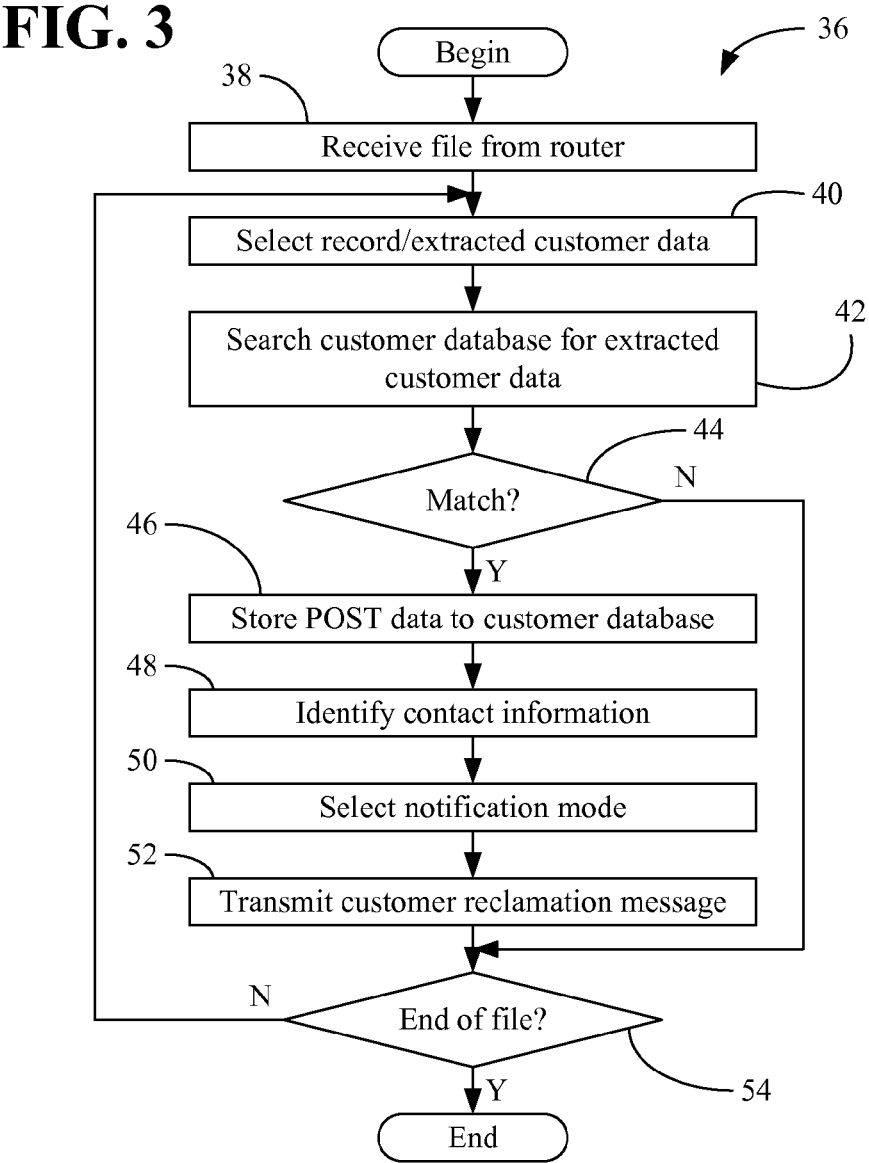
FIG. 3 is a flowchart of an example of a method of processing an outage log according to an embodiment.

Turning now to FIG. 3, a method 36 of processing an outage file is shown. The method 36 might be implemented in a host 16 (FIG. 1) of an e-commerce web site or other computing platform 18 (FIG. 1). In the illustrated example, the outage file/log is received from a router or other device at block 38. As already noted, the outage file could contain customer data extracted from one or more packets destined for a host of a web site during an outage condition associated with the host. The packets may be associated with transactions between customers and the web site, wherein the extracted customer data might include portions of cookies, IP addresses, HTTP headers, email addresses, HTTP POST data, and so on. A record of the file may be selected at block 40, wherein block 42 provides for searching a customer database for customer data corresponding to the selected file. If a match is not detected at block 44, a secondary log of unmatched records might be generated for further analysis and the next record can be selected.

If a match is detected at block 44, POST data (e.g. a shopping cart or order form) from the selected record may be stored to the customer database at block 46. For example, in the case of data submitted as a POST request, where the POST was incomplete and not received by the host, the POST data could be extracted from the outage file and saved in the customer database for later use if the customer returns. In addition, block 48 provides for identifying contact information for the customer if the extracted customer data is found in the customer database. Contact information could include a email address, IP address, postal address, instant messaging handle, etc. A notification mode may be selected at block 50 based on the type of contact information available. For example, if an email address is available, an email mode might be selected. In other examples, the source IP address could be matched to an email address of the customer. Otherwise, well documented methods of sending instant messaging (IM) messages to IP addresses could be used as "IM mode" of delivery. For example, the "net send" command of Windows XP Professional and Home operating system (OS) editions could be used in conjunction with the Messenger Service. The syntax of such a command would be: "net send {IP address/computer name/*(broadcast)}{message}". Other lost customer notification mechanisms may also be used.

Block 52 provides for transmitting a customer reclamation message to the customer based on the contact information and the notification mode. The customer reclamation message may apologize for the outage and request completion of the unsuccessful transaction between the customer and the web site. In particular, the customer reclamation message could include a URL (uniform resource locator) to coupons and/or special offers in order to incentivize the customer to return to the web site. If the end of the file has not yet been reached, block 54 provides for repeating the searching, identifying, selecting and transmitting for the remaining records in the file.

Figure 4:
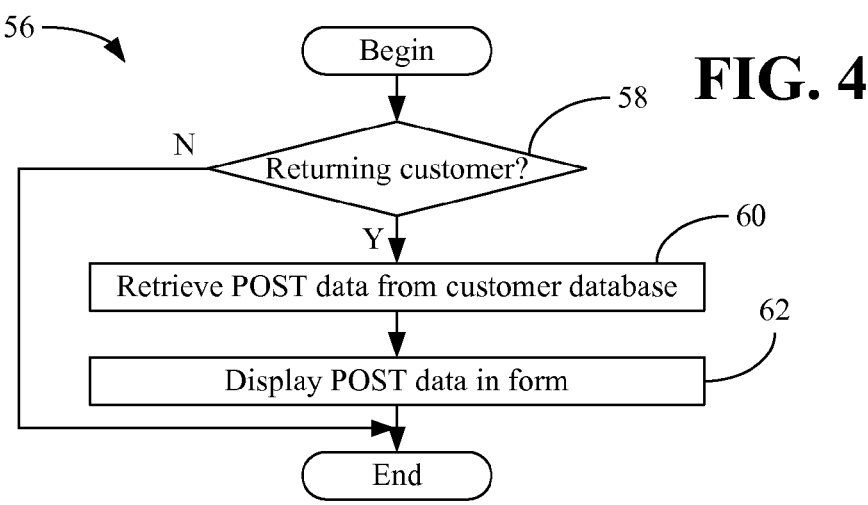
FIG. 4 is a flowchart of an example of a method of reclaiming an internet customer according to an embodiment.

FIG. 4 shows a method 56 of reclaiming a lost Internet customer that might be implemented in a host 16 (FIG. 1) of a web site. In the illustrated example, it is determined at block 48 whether a customer of a web site is returning from an unsuccessful transaction that was attempted during an outage of the web site. If so, block 60 provides for retrieving HTTP POST data from a customer database, and block 62 provides for displaying the HTTP POST data in a form. Thus, the host could then display data such as a shopping cart or order form if the customer returning has previously attempted to fill out the same form that was incomplete when the outage occurred.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer program product comprising:
a non-transitory computer readable storage medium; and
computer usable code stored on the computer readable medium, where, if executed by a processor, the computer usable code causes a computer to:
receive a file containing customer data extracted from a packet destined for a host of an electronic commerce (e-commerce) web site during an outage condition associated with the host, wherein the packet is to be associated with a transaction between a customer and the e-commerce web site, and the extracted customer data is to include Hypertext Transfer Protocol (HTTP) POST data and at least one of a cookie, an Internet Protocol (IP) address, an HTTP header, and an email address;
search a customer database for at least a portion of the extracted customer data;
store the HTTP POST data to the customer database if at least a portion of the extracted customer data is found in the customer database;
identify contact information for the customer if at least a portion of the extracted customer data is found in the customer database;
select a notification mode based on the contact information;
transmit a customer reclamation message to the customer based on the contact information and the notification mode, wherein the customer reclamation message is to request completion of the transaction between the customer and the e-commerce web site;
detect a return of the customer to the e-commerce web site; and
display the HTTP POST data in a form in response to detecting the return of the customer.

2. The computer program product of claim 1, wherein the HTTP POST data is to be associated with a shopping cart.

3. The computer program product of claim 1, wherein the computer usable code is to further cause a computer to repeat the searching, identifying, selecting and transmitting for a plurality of records in the file.

4. The computer program product of claim 1, wherein the customer reclamation message is to include at least one of a coupon, a special offer and an apology.

5. The computer program product of claim 1, wherein the notification mode is to include at least one of an email mode and an instant messaging mode.

6. A computer program product comprising:
a non-transitory computer readable storage medium; and
computer usable code stored on the computer readable medium, where, if executed by a processor, the computer usable code causes a computer to:
detect an outage condition associated with a host of an electronic commerce (e-commerce) web site;
extract customer data from a packet destined for the host, wherein the packet is to be associated with a transaction between a customer and the e-commerce web site, and the extracted customer data is to include at least one of a cookie, an Internet Protocol (IP) address, a Hypertext Transfer Protocol (HTTP) header, an email address, and HTTP POST data;
store the extracted customer data to a file;
detect a resolution of the outage condition;
determine whether the customer has been affected by the outage condition based on the extracted customer data;
exclude the extracted customer data from the file if the customer has not been affected by the outage condition; and
transmit the file to the host in response to detecting the resolution of the outage condition.

7. The computer program product of claim 6, wherein the HTTP POST data includes shopping cart data.

8. The computer program product of claim 6, wherein the computer usable code causes a computer to at least one of:
detect a loss of packets destined for the host that exceeds a packet loss threshold; and
detect a rejection of packets destined for the host that exceeds a packet rejection threshold.

9. The computer program product of claim 6, wherein the outage condition is to be associated with at least one of a denial of service attack, a network failure and an application failure.

10. The computer program product of claim 6, wherein computer usable code is to further cause a computer to repeat the extracting and storing for a plurality of transactions between a plurality of customers and the e-commerce web site.

11. A computer-implemented method comprising:
detecting an outage condition associated with a host of an electronic commerce (e-commerce) web site, wherein the outage condition is associated with at least one of a denial of service attack, a network failure and an application failure;
extracting customer data from a packet destined for the host, wherein the packet is associated with a transaction between a customer and the e-commerce web site, and the extracted data includes Hypertext Transfer Protocol (HTTP) POST data associated with a shopping cart;
storing the extracted customer data;
detecting a resolution of the outage condition;
searching a customer database for the extracted customer data;
identifying contact information for the customer if the extracted customer data is found in the customer database;
selecting a notification mode based on the contact information;
transmitting a customer reclamation message to the customer based on the contact information and the notification mode, wherein the customer reclamation message requests completion of the transaction between the customer and the e-commerce web site;
detecting a return of the customer to the e-commerce web site; and
displaying the HTTP POST data in a form in response to detecting the return of the customer.

12. The computer-implemented method of claim 11, further including confirming that the customer has been affected by the outage condition based on the extracted customer data.

13. The computer-implemented method of claim 11, wherein detecting the outage condition includes at least one of detecting a loss of packets destined for the host that exceeds a packet loss threshold, and detecting a rejection of packets destined for the host that exceeds a packet rejection threshold.

14. The computer-implemented method of claim 11, wherein the extracted customer data further includes at least one of a cookie, an Internet Protocol (IP) address, an HTTP header and an email address.

15. The computer-implemented method of claim 11, wherein the customer reclamation message includes at least one of a coupon, a special offer and an apology.

16. The computer-implemented method of claim 11, wherein the notification mode includes at least one of an email mode and an instant messaging mode.

17. The computer-implemented method of claim 11, further including storing the HTTP POST data to the customer database.

* * * * *